United States Patent [19]
Heindel

[11] Patent Number: 5,939,002
[45] Date of Patent: Aug. 17, 1999

[54] APPARATUS AND PROCESS FOR CHANGING A SIDEWALL INSERT OF A TIRE MOLD

[75] Inventor: John F. Heindel, Spartanburg, S.C.

[73] Assignee: Michelin Recherche et Technique S.A., Switzerland

[21] Appl. No.: 08/840,743

[22] Filed: Apr. 16, 1997

[51] Int. Cl.[6] .................................................. B29C 35/02
[52] U.S. Cl. .............................. 264/219; 249/56; 249/57; 264/315; 264/326; 425/47; 425/195
[58] Field of Search ..................................... 264/315, 326, 264/219; 425/36, 38, 47, 54, 195, 46, 35; 156/116; 249/56, 57

[56] References Cited

U.S. PATENT DOCUMENTS

| | | |
|---|---|---|
| 2,046,372 | 7/1936 | Engstrom . |
| 3,518,335 | 6/1970 | Jablonski ................................ 264/326 |
| 4,684,431 | 8/1987 | Shurman et al. ........................ 156/116 |
| 4,743,322 | 5/1988 | Holroyd et al. ........................... 425/47 |
| 4,921,412 | 5/1990 | Scantland et al. . |
| 5,259,742 | 11/1993 | Ichikawa et al. . |
| 5,261,804 | 11/1993 | Jachowsky . |
| 5,269,669 | 12/1993 | Ladouce . |
| 5,382,402 | 1/1995 | Espie et al. . |
| 5,643,519 | 7/1997 | Mauro et al. ............................ 264/326 |
| 5,798,076 | 8/1998 | Ladouce .................................... 425/47 |

*Primary Examiner*—Mathieu D. Vargot
*Attorney, Agent, or Firm*—Alan A. Csontos; Robert R. Reed

[57] ABSTRACT

A molding apparatus and process is described in which a side wall mold insert is accessible and releasable from the interior of the molding apparatus. A fastener reversibly seats the side wall insert to the mold frame, the insert having an inclined rim wall for engaging a complementary-shaped wall of an adjacent tread mold piece. The process and apparatus facilitates the rapid replacement of a side wall mold insert without disassembly or cooling of the molding components.

16 Claims, 11 Drawing Sheets

APPARATUS AND PROCESS FOR CHANGING A SIDEWALL INSERT OF A TIRE MOLD

BACKGROUND OF THE INVENTION

The present invention relates to tire molds. More particularly, it relates to an apparatus and process for changing a sidewall insert of a tire mold.

It is well known that sidewalls of tires bear a large number of markings which may include: a manufacturer identification; a trademark; markings identifying the type of tire; size; loading ratings; and speed capability. Typically, these markings are molded onto the sidewall of the tire as the tire is cured in a tire mold using cut-outs or raised portions corresponding to the markings on the mold.

Typical tire molding equipment may comprise a typical clam shell type mold having a top and bottom mold sections or alternatively comprise a segmented type mold having individual tread mold segments fastened on the opposing upper mold frame and/or lower mold frames. In molds of these types, as the sidewall information or characteristics of the tire changes, a mold having different sidewall information is used. Heretofore, replacing the tire sidewall molds involved a labor intensive mold dismantling procedure which resulted in considerable production time losses.

Heretofore, sidewall mold inserts have been secured through attachment means which engage the sidewall mold inserts from the base of the mold frame. As a result, the entire mold was removed from the curing press and disassembled whenever a new sidewall mold plate was required. The disassembly required several hours to complete with the attendant loss of production. In accordance with this invention, it has been found that by attaching the mold sidewall inserts to the mold frame in a manner accessible from the mold interior, the changeover time for removing a sidewall insert and replacing with a new insert may be considerably reduced. Further, the tooling expense of a new mold, coupled with the costly changeover time, limited the availability of customized private label branding. Accordingly, there is room for improvement and variation within the art.

SUMMARY OF THE INVENTION

The object of the present invention is to facilitate the changeover between tire sidewall mold inserts.

Another object of the present invention is to provide a novel molding insert securement assembly which provides for the rapid release of a side wall mold segment which can in turn be replaced with a different side wall mold segment.

It is yet another object of this invention to provide a novel attachment means for securing sidewall mold insert to the mold frame, thereby providing a more efficient manner of removing and replacing sidewall mold inserts.

These and other objects of the invention are provided by a mold for curing a tire, the mold having an axis, tread mold inserts for molding a tread region of the tire, sidewall mold inserts for molding a sidewall region of the tire, and a mold frame for supporting the tread mold inserts and the sidewall mold inserts, the improvement comprising: a mold frame having an aperture open on at least the axially inward side of the mold frame;

a sidewall mold insert having means forming a through aperture extending completely through the sidewall mold insert so as to be open on both the axially inward and axially outward sides of the sidewall mold insert, the sidewall mold insert being positionable axially inwardly of the mold frame relative to the axis of a tire molded in the mold assembly such that the mold frame aperture and the through aperture of the sidewall mold insert are aligned with one another with the through aperture axially inward of the mold frame aperture; and, a fastener disposable in the aligned apertures between a seated disposition in which the fastener is seated in both apertures and a non-seated disposition in which the fastener is not seated in the mold frame aperture and the through aperture forming means having means for preventing axially outward movement of the fastener in its seated disposition beyond an extent that the fastener would be completely unseated from the through aperture. Further, the fastener has a distal end portion and a proximate end portion, the proximate end portion being disposed in the through aperture of the sidewall mold insert and the distal end portion being disposed in the mold frame in the seated disposition of the fastener, and the proximate end portion of the fastener includes an enlarged radial segment having a radial extent greater than any radial extent of the distal end portion of the fastener and the through aperture forming means including an enlarged radial portion extending from the axially inward side of the sidewall mold insert and a lesser radial portion having a smaller radial extent than the enlarged radial portion and extending from the enlarged radial portion to the axially outward side of the sidewall mold insert, the enlarged radial portion and the lesser radial portion forming a shoulder portion operable to engage the enlarged radial segment of the proximate end portion of the fastener so as to prevent axially outward movement of the fastener.

A variation of the invention provides a mold frame having an aperture open on the axially inward side of the mold frame and extending at most along a partial portion of the axial extent of the mold frame, as measured along the aperture axis, such that the aperture is not open on the axially outward side of the mold frame;

a sidewall mold insert having means forming a through aperture extending completely through the sidewall mold insert so as to be open on both the axially inward and axially outward sides of the sidewall mold insert; the sidewall mold insert being positionable axially inwardly of the mold frame relative to the axis of a tire molded in the mold assembly such that the mold frame aperture and the through aperture of the sidewall mold insert are aligned with one another with the through aperture axially inward of the mold frame aperture; and a fastener disposable in the aligned apertures between a seated disposition in which the fastener is seated in both apertures and a non-seated disposition in which the fastener is not seated in the mold frame aperture and the fastener having an axial extent less than the combined axial extents of the aligned mold frame aperture and the through aperture. Further, the fastener has a distal end portion and a proximate end portion, the proximate end portion being disposed in the through aperture of the sidewall mold insert and the distal end portion being disposed in the mold frame in the seated disposition of the fastener, and the proximate end portion of the fastener includes an enlarged radial segment having a radial extent greater than any radial extent of the distal end portion of the fastener and the through aperture forming means including an enlarged radial portion extending from the axially inward side of the sidewall mold insert and a lesser radial portion having a smaller radial extent than the enlarged radial portion and extending from the enlarged radial portion to the axially outward side of the sidewall mold insert, the enlarged radial portion and the lesser radial portion forming a shoulder portion operable to engage the enlarged radial segment of the proximate end portion of the fastener so as to prevent axially outward movement of the fastener.

The invention will be better understood by reference to the following description, read in conjunction with the drawings, which will make all aspects of the invention clearly understood.

DESCRIPTION OF PREFERRED EMBODIMENTS

The present invention provides a novel side wall mold insert securement assembly comprising a plurality of removable fasteners and a corresponding plurality of fastener receiving apertures and frame apertures. The present invention makes use of an attachment assembly which is accessed from the mold interior of each mold half.

Figure 1:
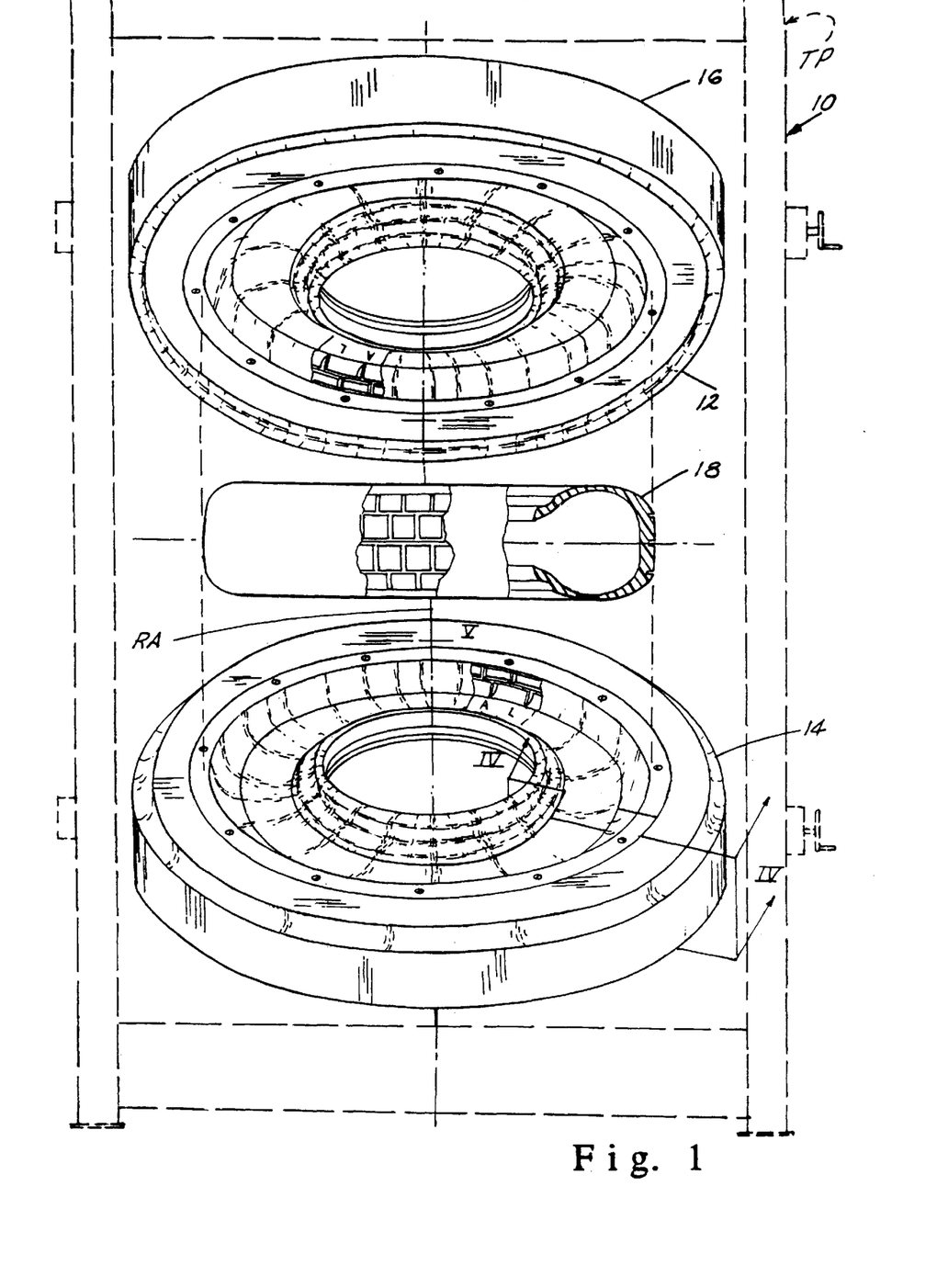
FIG. 1 is a perspective view of a clam shell type mold in an open position along with a reference molded tire seen in partial section.
Figure 2:
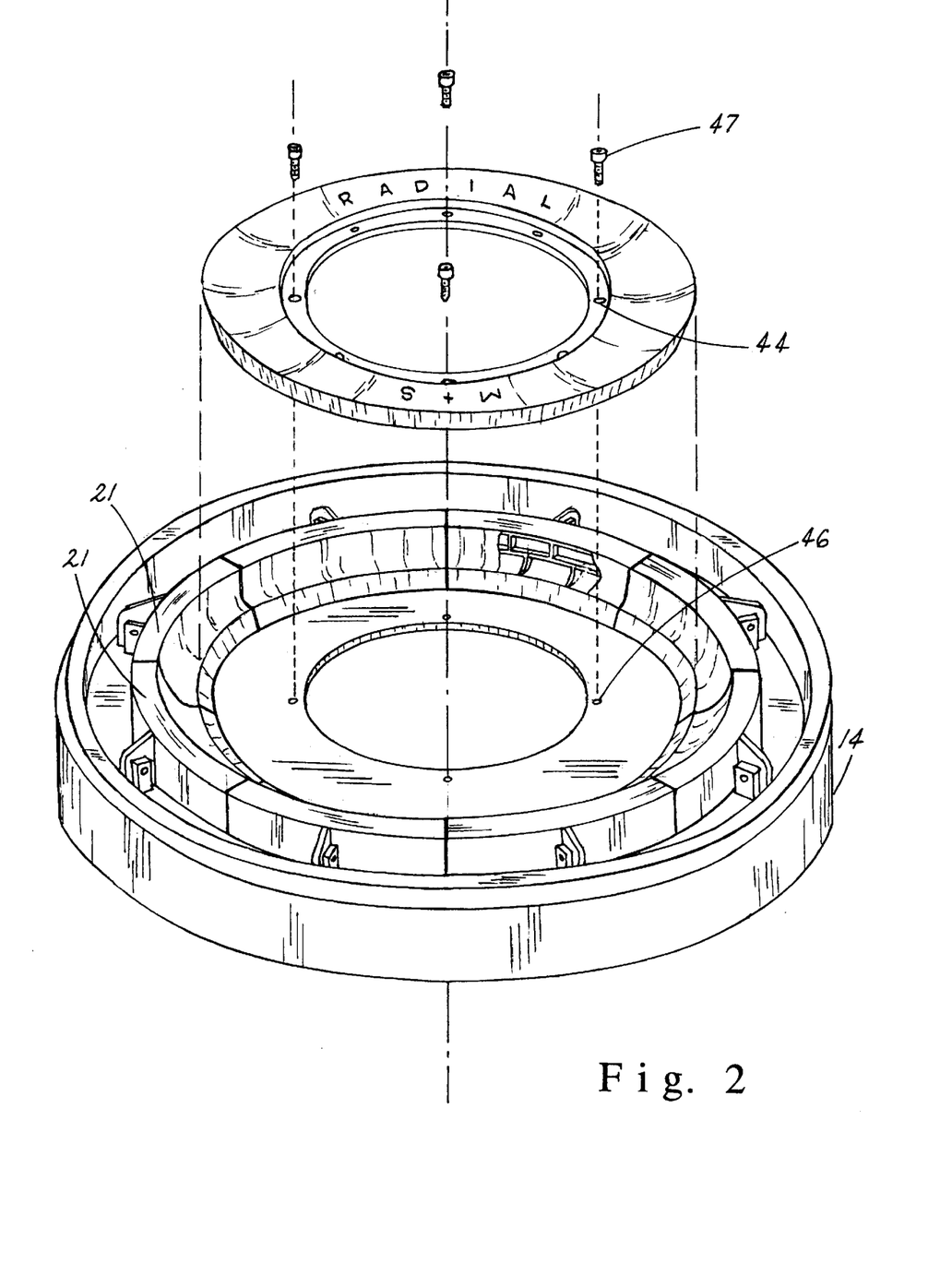
FIG. 2 is an exploded perspective view of a mold half having segmented or sector type tread mold segments and showing the sidewall insert thereof.
Figure 3:
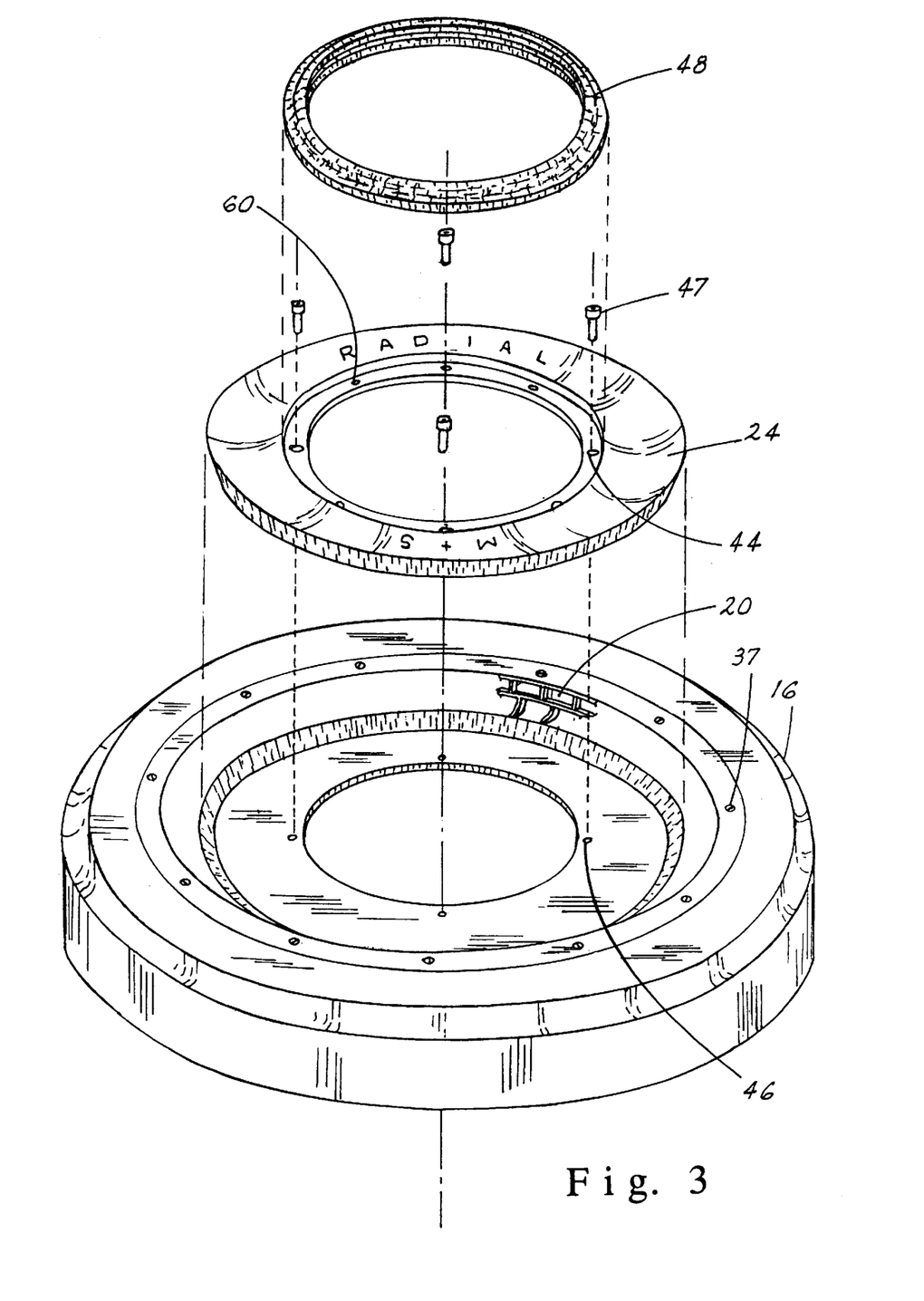
FIG. 3 is an exploded perspective view of the bottom half of the clam shell tire mold of FIG. 1 and showing a sidewall insert in combination with an adjacent bead ring insert.

As seen in reference to FIGS. 1–3, a clam shell type mold 10 has an upper half 12 and a lower half 14. Each half 12, 14 includes a mold frame assembly in the form of a mold frame 16 in which various mold insert assemblies are secured, as will be explained below. Following a tire curing or vulcanizing cycle, cured tires 18 are removed from the mold 10 which is then ready to mold a subsequent tire.

The design of a tire mold is formed from substantially identical upper and lower halves. For clarification, reference to a single mold half 14 is used. One having ordinary skill in the art will readily understand that similar details of construction and design are also provided in the complimentary upper mold half.

Figure 4:
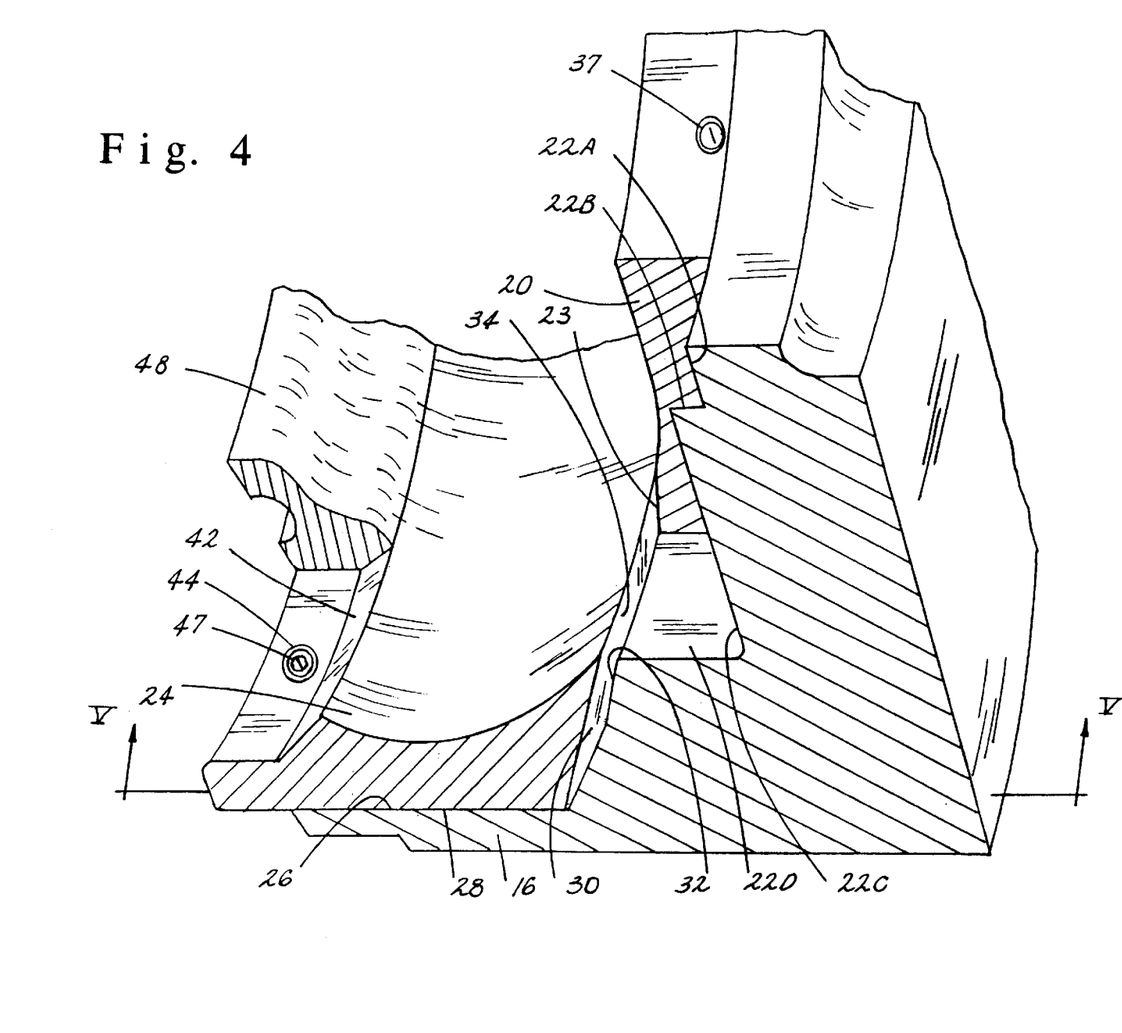
FIG. 4 is a radial section of the bottom half of the clam shell mold of FIG. 1 taken along the lines of IV—IV.

A tire mold insert assembly in the form of a tire tread mold insert 20 is seated (FIGS. 4 & 5) against multiple ledges 22A, 22B, 22C and 22D defined by complimentary shaped surfaces in mold frame 16. As seen in reference to FIG. 2, a plurality of tread mold sectors or segments 21 can be provided or alternatively, a single insert 20 may be provided as further described below. The assembled mold further comprises a sidewall mold assembly in the form of the sidewall mold insert 24 having a planar surface extending perpendicularly to the referenced axis RA (FIG. 1) and seated on a flat surface 26 of the base 28 of mold frame 16. An outer circumferential rim 30 of sidewall mold insert 24 is tapered inwardly such that, in the installed position of the sidewall mold insert 24, the rim 30 lies on the line forming an included acute angle alpha which referenced the axis RA. The rim 30 engages along a lower portion of a complimentary shaped wall 32 of mold frame 16. Upper edge of rim 30 engages, along a length 34, an edge portion 23 of the tread mold insert 20. Tread mold edge wall 23 lies within the same plane as mold frame wall 32 and collectively form a complementary surface for engaging the tapered edge of the circumferential rim wall 30 of sidewall insert 24. As seen in references to FIGS. 2, 3, and 5, the sidewall mold insert has a circumferential rim 30 in which an upper portion 34 has a wider circumference than the lower portion of the circumferential rim wall 30. As seen in reference to FIG. 3, the tapered dimension of rim 30 nests against the complimentary edge wall surfaces 32 and 23 of the respective mold frame 16 and tire tread insert 20. This arrangement makes possible the insertion and removal of the sidewall mold insert without removing the tread wall mold. Tread mold insert 20 is secured to the mold frame 16 through conventional fasteners in the form of lower fasteners 36 and upper fasteners 37.

Figure 5:
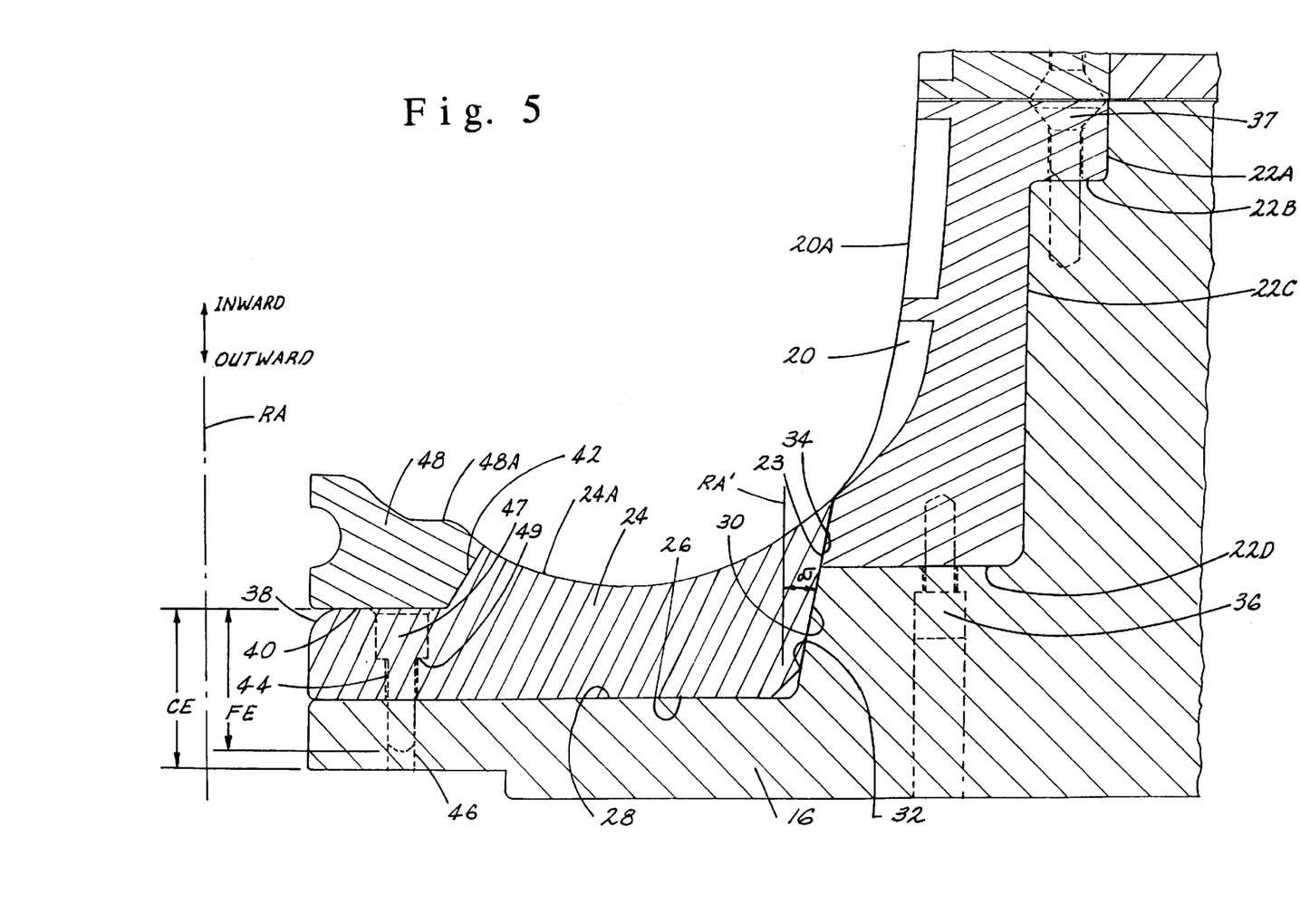
FIG. 5 is a radial section of the bottom half of the clam shell mold of FIG. 1 taken along the view of V—V in FIG. 4.
Figure 6:
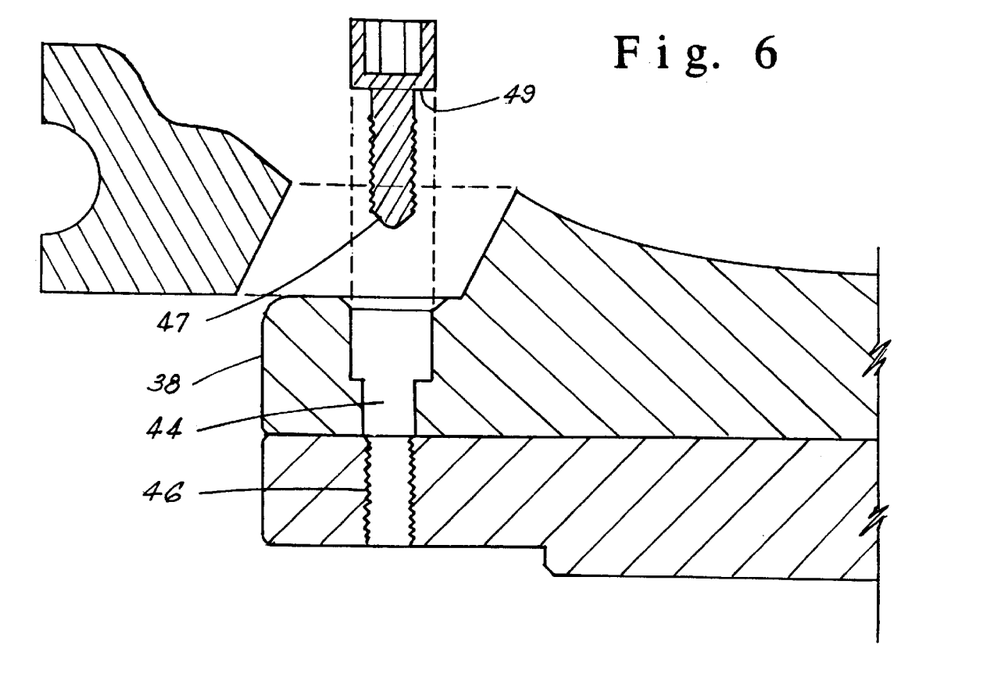
FIG. 6 is an elevation view of a portion of the tire mold shown in FIG. 5 showing details of the attachment assembly construction according to the invention.
Figure 7:
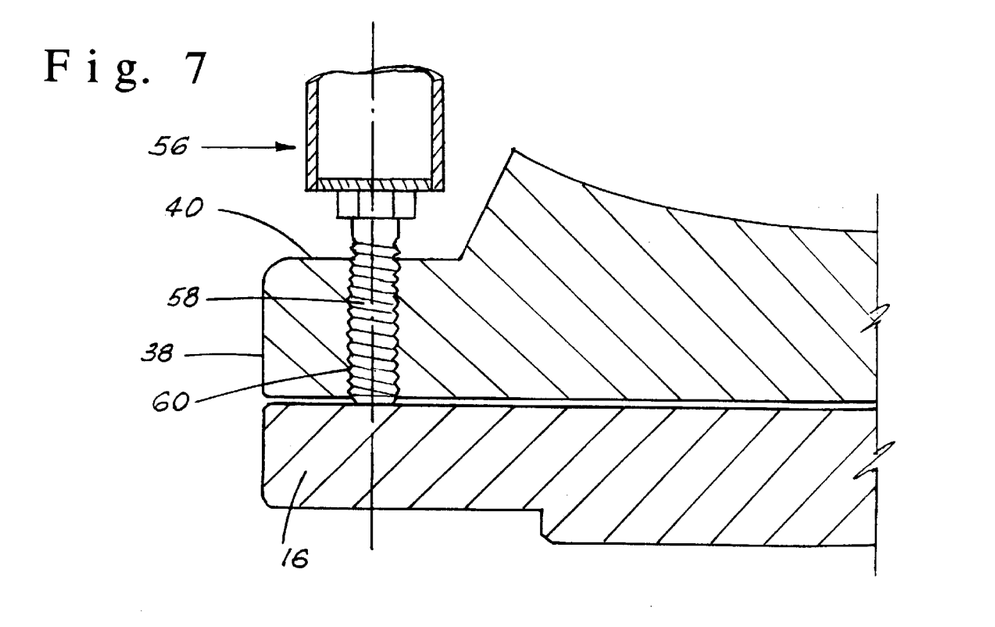
FIG. 7 is an elevation view of a portion of the mold shown in FIG. 5 and showing a section line which intercepts a mold insert aperture used to break the tapered fit of the mold insert to the mold frame in conjunction with the illustrated threaded tooling.
Figure 8:
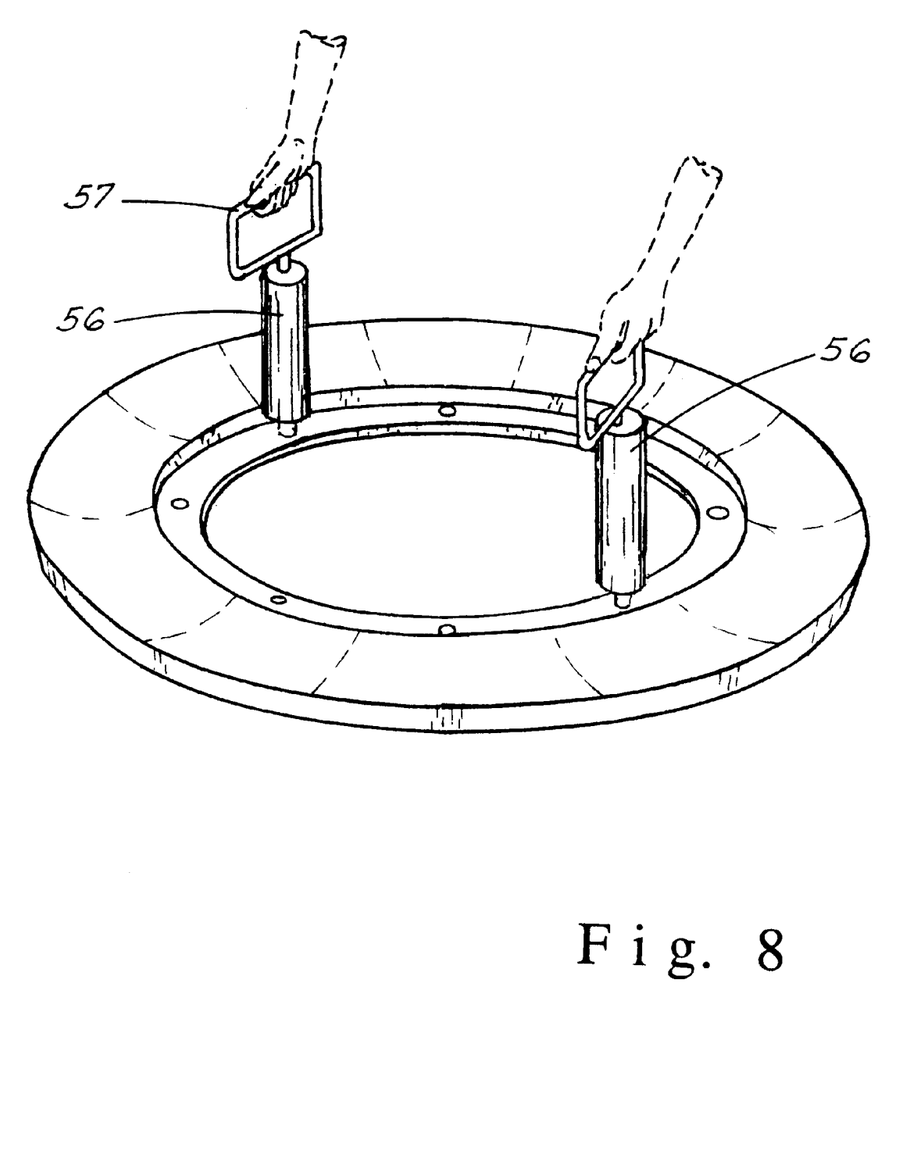
FIG. 8 illustrates the use of the threaded tooling during the removal/replacement of a sidewall mold insert of the present invention.

As best seen in reference to FIG. 5, an inner rim 38 of side wall insert 24 is associated with a flattened, reduced thickness flange 40. Flange 40 terminates adjacent a sharply inclined end wall 42. A plurality of fastener receiving apertures 44 are defined by sidewall mold frame insert 24 and are in communication with flange surface 40. Apertures 44 are in axial alignment with mold frame apertures 46, wherein a threaded fastener such as a bolt 47 is used to secure the sidewall mold insert 24 to the frame.

In accordance with one aspect of the present invention, the mold frame apertures 46 are open on only the axially inward side of the mold frame 16 (distance FE), as viewed relative to the referenced axis RA. However, it is contemplated that the mold frame apertures may be open on both the axially inward and axially outward sides (distance CE) of the mold frame 16, if desired.

Also, the sidewall mold insert 24 having means forming a through aperture extending completely through the sidewall mold insert in the form of the fastener receiving apertures 44 so as to be open on both the axially inward and axially outward sides of the sidewall mold insert. The sidewall mold insert 24 is positionable axially inwardly of the mold frame 16 relative to the referenced axis RA such that each mold frame aperture 46 and a respective one of the through apertures 44 are aligned with one another with the through aperture axially inward of the respective mold frame aperture.

Additionally, the fastener such as the bolt 47 is disposable in the aligned apertures between a seated disposition in which the fastener is seated in both apertures and a non-seated disposition in which the fastener is not seated in the mold frame aperture and the through aperture forming means having means for preventing axially outward movement of the fastener in its seated disposition beyond an extent that the fastener would be completely unseated from the through aperture 44 of the sidewall mold insert 24.

The bolt 47 has a distal end portion and a proximate end portion, the proximate end portion being disposed in the through aperture of the sidewall mold insert and the distal end portion being disposed in the mold frame in the seated disposition of the fastener, and the proximate end portion of the fastener includes an enlarged radial segment having a radial extent greater than any radial extent of the distal end portion of the fastener and the through aperture forming means including an enlarged radial portion extending from the axially inward side of the sidewall mold insert and a lesser radial portion having a smaller radial extent than the enlarged radial portion and extending from the enlarged radial portion to the axially outward side of the sidewall mold insert, the enlarged radial portion and the lesser radial portion forming a shoulder portion 49 operable to engage the enlarged radial segment of the proximate end portion of the fastener so as to prevent axially outward movement of the fastener.

In the assembled mold, a bead ring insert 48 seats against the flange 40 and end wall 42 of the sidewall mold insert without any separate attachment means for attaching the bead ring 48 to the sidewall mold insert 24. Preferably, bead ring 48 is secured in its installed position by a conventional securement device such as, for example, a device commonly known as a Bagwell.

It is well known and apparent within the art, that the precision mold components are constructed to exacting tolerances so that a nearly seamless molded product is produced. Because of the very high mold pressures used, the attachment means described above are useful for positioning the mold assembly components. The subsequent high molding pressure and elevated temperatures provide strong compressive forces which firmly seat the mold components into a precise spatial alignment. The alignment between the "joint planes", i.e., the inner faces between the adjacent inserts described above, is preferably optimized to minimize mold flashing or unsightly seam lines on the cured tire.

In reference to FIG. 5, tread mold insert surface 20A, sidewall insert surface 24A, and the bead ring insert surface 48A collectively define the overall molding surface which contacts the uncured tire to form thereon the resulting cured tire exterior. The interfaces between the adjacent molding surfaces are extremely tight so that the sectional nature of the mold is barely perceptible in the molded final product.

An alternative embodiment (FIGS. 11 & 12) of the present invention is provided by a clam shell type mold press having an upper half and a lower half. Each half further provides a mold frame assembly in the form of a mold frame 116. A tire mold insert assembly in the form of a tire tread mold insert 120 is seated against multiple ledges 122A, 122B, 122C and 122D defined by complimentary shaped surfaces of mold frame 116.

Figure 11:
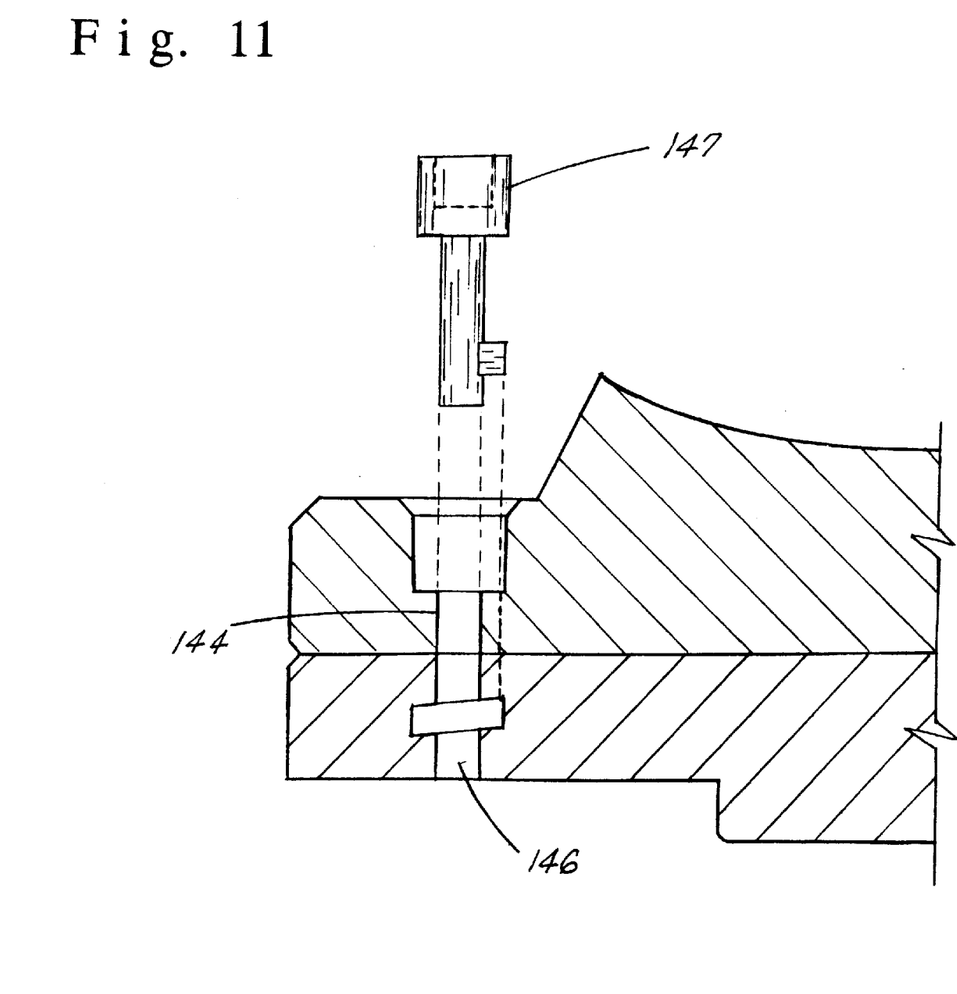
FIG. 11 is a sectional view showing an alternative type of fastener for attaching and releasing a sidewall portion of a mold.
Figure 12:
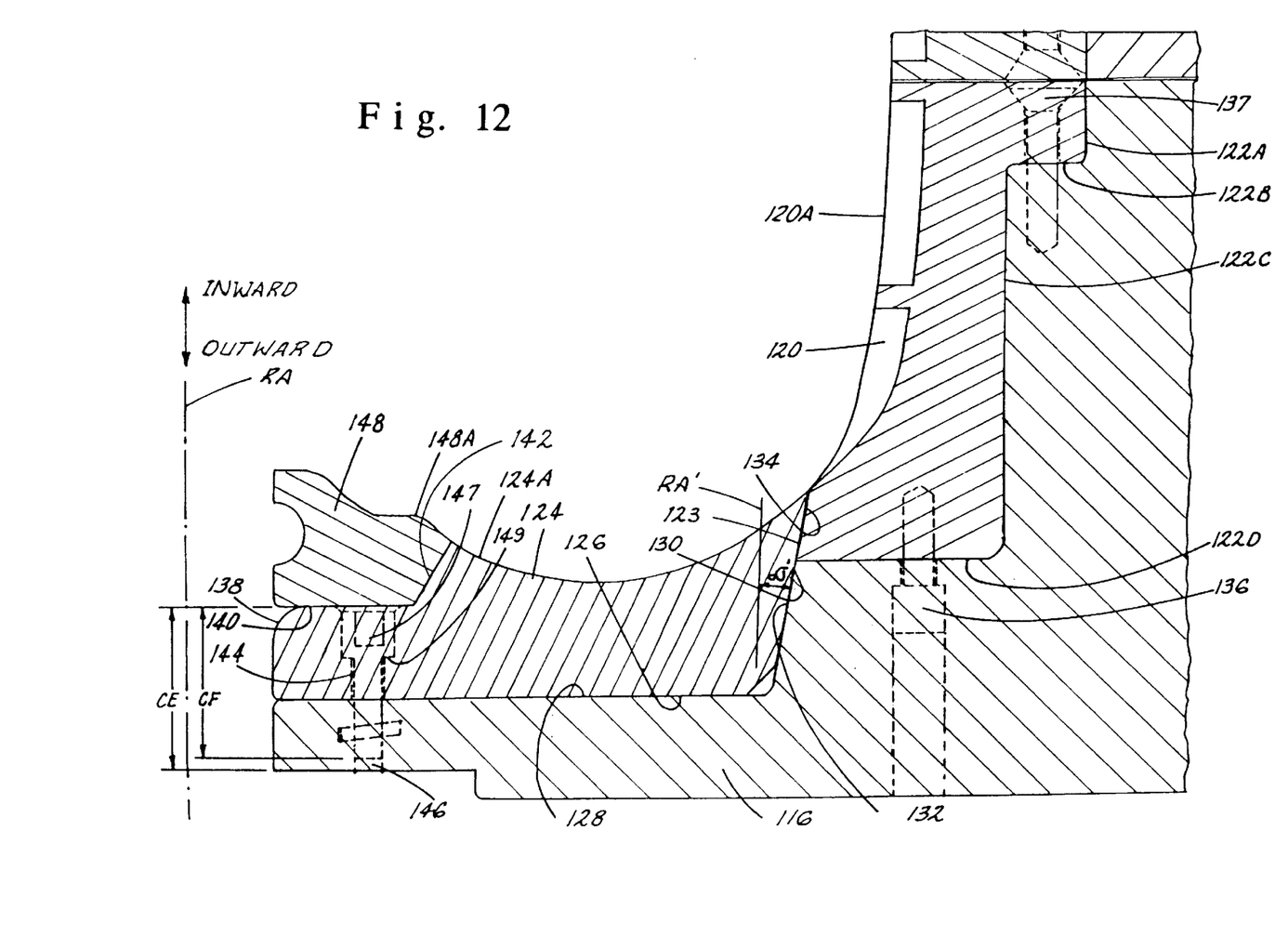
FIG. 12 is a radial section similar to FIG. 5 of the alternative embodiment of the present invention shown in FIG. 11.

In the assembled mold, a sidewall mold assembly is in the form of a sidewall mold insert 124 having a planar surface extending perpendicularly to the reference axis RA (FIG. 1) and seated on a flat surface 126 of the base 128 of mold frame 116. An outer circumferential rim 130 of sidewall insert 124 is tapered inwardly such that, in the installed position of the sidewall mold insert 124, the rim 130 lies on a line forming an included acute angle, $\alpha$, with reference to axis RA. The rim 130 engages along a lower portion of a complimentary shaped wall 132 of mold frame 116. An upper edge of rim 130 engages, along a length portion 134, an edge portion of the tread mold insert 120. Tread mold insert 120 is secured to the mold frame 116 through a latch type key-way fastener seen as fasteners 147.

An inner rim 138 of side wall insert i24 is associated with a flattened, reduced thickness flange 140. Flange 140 terminates adjacent a sharply inclined end wall 142. A plurality of key way receiving apertures 144 are defined by sidewall mold frame 116 and are in communication with flange surface 140. Key way apertures 144 are in axial alignment with mold frame key way apertures 146, wherein a reversible key way fastener such as a key way 147 is used to secure the sidewall mold insert 124 to the frame.

In accordance with one aspect of the present invention, the mold frame apertures 146 are open on only the axially inward side of the mold frame 116 (distance FE), as viewed relative to the referenced axis RA. However, it is contemplated that the mold frame apertures may be open on both the axially inward and axially outward sides (distance CE) of the mold frame 116, if desired.

Also, the sidewall mold insert 124 having means forming a through aperture extending completely through the sidewall mold insert in the form of the fastener receiving apertures 144 so as to be open on both the axially inward and axially outward sides of the sidewall mold insert. The sidewall mold insert 124 is positionable axially inwardly of the mold frame 116 relative to the referenced axis RA such that each mold frame aperture 146 and a respective one of the through apertures 144 are aligned with one another with the through aperture axially inward of the respective mold frame aperture.

Additionally, the fastener such as the key way 147 is disposable in the aligned apertures between a seated disposition in which the key way is seated in both apertures and a non-seated disposition in which the key way fastener is not seated in the mold frame aperture and the through aperture forming means having means for preventing axially outward movement of the fastener in its seated disposition beyond an extent that the fastener would be completely unseated from the through aperture 144 of the sidewall mold insert 124.

The key way fastener 147 has a distal end portion and a proximate end portion, the proximate end portion being disposed in the through aperture of the sidewall mold insert and the distal end portion being disposed in the mold frame in the seated disposition of the fastener, and the proximate end portion of the fastener includes an enlarged radial segment having a radial extent greater than any radial extent of the distal end portion of the fastener and the through aperture forming means including an enlarged radial portion extending from the axially inward side of the sidewall mold insert and a lesser radial portion having a smaller radial extent than the enlarged radial portion and extending from the enlarged radial portion to the axially outward side of the sidewall mold insert, the enlarged radial portion and the lesser radial portion forming a shoulder portion 149 operable to engage the enlarged radial segment of the proximate end portion of the fastener so as to prevent axially outward movement of the fastener.

In the conventional tire molding machine, the lower mold is mounted, face up, to a lower portion of the mold press frame. The upper mold is mounted, face down, to the upper mold mounting frame member which is vertically moveable. The upper mold frame is moved down to the lower mold frame by means of a horizontal beam, sidearms, and cranks thereby closing the upper and lower mold halves.

The process of replacing the sidewall mold inserts is set forth below. While there is variation in the type and construction details of various tire molds, one having skill in the art will, without undue experimentation, be able to make minor adjustments to the described process to accommodate individual mold construction and operation details. An exemplary process is provided as follows:

Removal of the Upper Mold Sidewall Insert

Upon opening the mold, the bladder and locking collar are removed from the lower mold. The upper mold cylinder is lowered along with the upper mold bead ring. The conical tip of the cylinder ram is then removed which permits additional clearance for operation of the ram, which in turn, provides greater access to the upper mold cavity.

The upper mold sidewall fasteners 47 are loosened but not removed from the threaded apertures 46. A spacer 50 (FIG. 9) in the form of a pair of side plates 52 connected by one or more semicircular metal rods, is placed upon the bead ring 48. The distance between the spacer plates is adjustable by varying the position along the ends of the connecting rods and allows rapid adjustments to accommodate different size molds.

Figure 9:
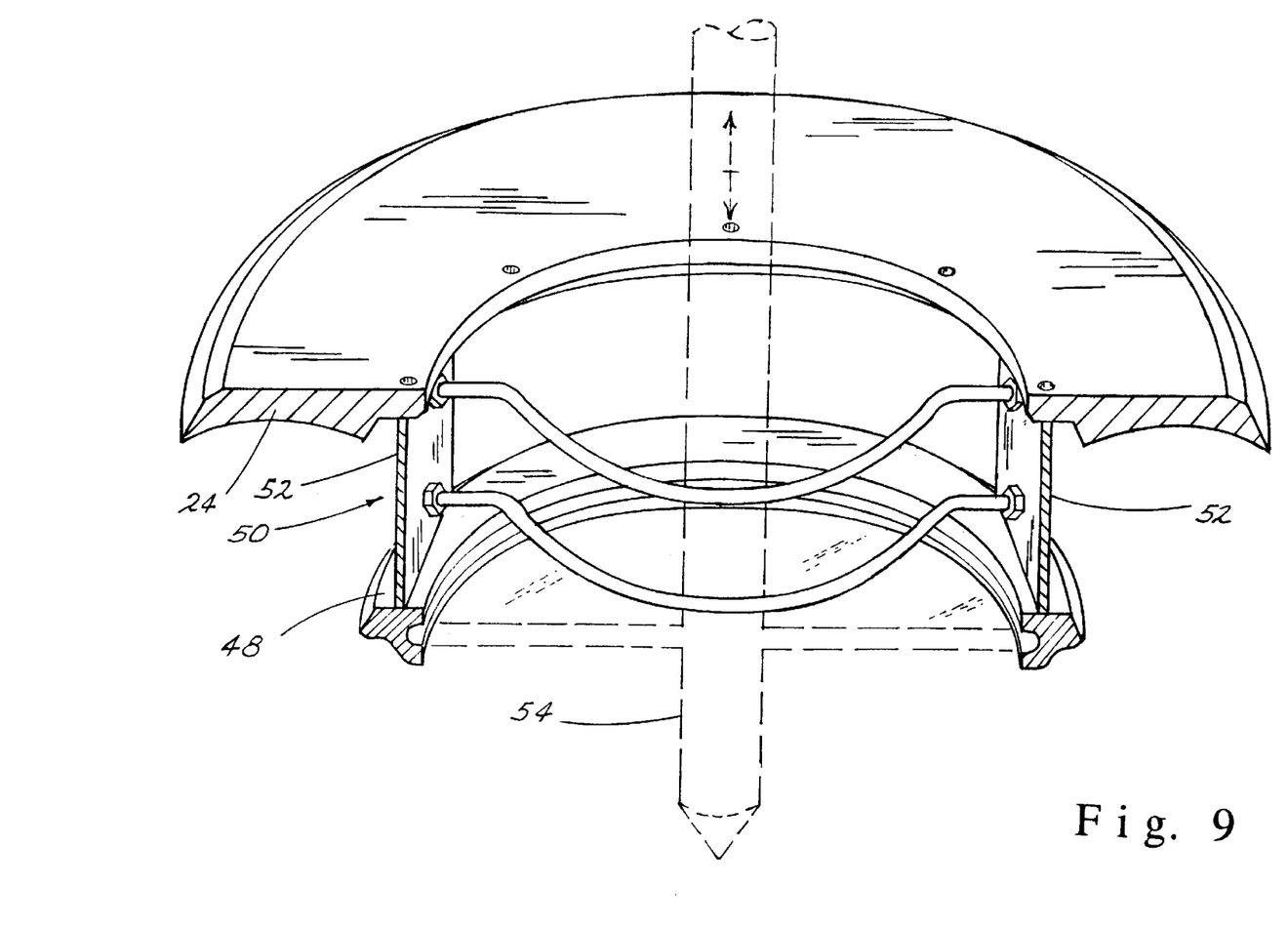
FIG. 9 illustrates an apparatus used in certain process steps in the removal and replacement of a sidewall mold insert of an upper mold half of a mold press.

At this point, the ram 54 lifts the bead ring and spacer until the upper edge of each side plate 52 firmly engages the side wall insert 24 of the upper mold. Fasteners 47 are then completely removed from aperture 46. The sidewall insert is then free to rest upon side plates 52 as the ram and upper bead ring are lowered. If necessary to break compression forces arising from the tapered fit which may continue to bind insert 24 even after the fasteners are removed, the threaded insert tool 56 described below can be used to break the compression and release the insert from the mold.

Upon lowering the ram and associated bead ring and disengaging the ram from the bead ring, the sidewall insert is also lowered and can be removed. A new sidewall insert 24 can then be installed by reversing the above steps, i.e., placing the new mold on the side plates 52; re-engaging and raising the ram 54 carrying the side plates and new insert; attaching the sidewall insert to the mold frame with fasteners 47; removing the side plates 52; and, repositioning the upper mold bead ring 48.

Figure 10:
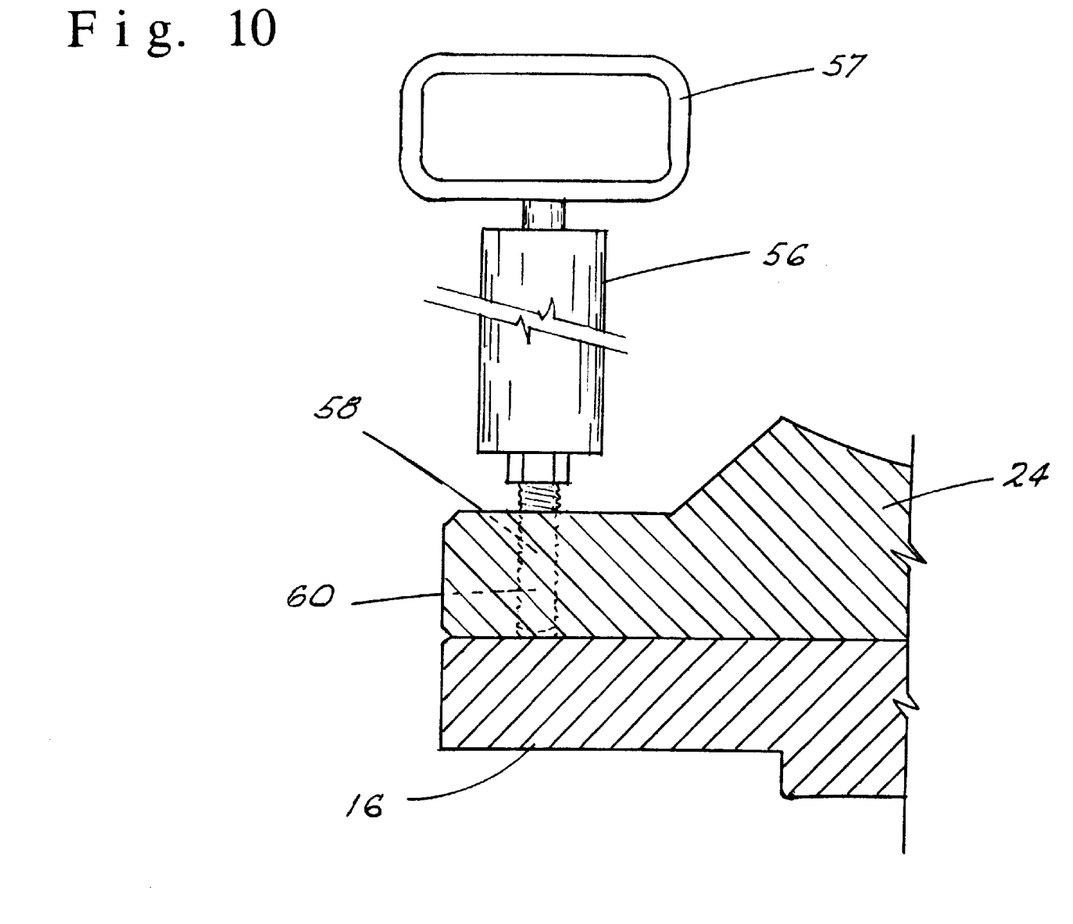
FIG. 10 illustrates the threaded tooling used to release and carry the sidewall insert.

Removal of the Lower Sidewall Insert:

If not previously removed, the bladder and bead ring 48 are removed from the lower mold. The bead ring removal exposes the fasteners 47 which are subsequently removed. As seen in reference to FIGS. 6–8 and 10, a tooling 56, having a threaded tip 58, is inserted into aperture 60 which is defined along the flange portion of the sidewall mold insert. A similar tooling is used to engage a second aperture 60. As best seen in reference to FIG. 10, when the fully threaded tip 58 is further engaged a half rotation, the tooling engages the mold frame 16 opposite aperture 60. The further engagement breaks the compression fit and releases the sidewall mold insert from the mold frame. The handles 57 of tooling 56 are then used to lift and remove the insert. A new insert is then placed within the mold and secured with fasteners 47 or the alternative key way fasteners 147.

The present invention offers several advantages over the prior art. One such advantage is the ability to remove and exchange a sidewall mold insert from a hot mold without either the dismantling or cooling of the entire mold. Heretofore, mold changes were made using cooled components so as to better control the mold joint planes and minimize flashing on the resulting cured tire. The present design enables the removal of one secured component, i.e. the side wall insert, without disturbing the relative position of the tread mold insert or the corresponding mold frame.

As a result, the new side wall insert may be installed cold into the otherwise heated mold press. Upon heating, the side wall mold insert expands into the proper spacial alignment to form a desired tight mold joint plane. Such an arrangement is facilitated by the inclined rim wall 30 of the side wall mold insert which nests within the complementary-shaped walls of the tread mold insert and mold frame.

Since the tire mold insert remains attached to the mold frame, the mold frame and tread mold insert remain as a fixed reference point. As a result, the side wall mold insert may be removed and replaced with an unheated side wall mold insert. Once attached by the fasteners, the entire mold assembly can be quickly brought to operating temperatures. In so doing, the side wall mold insert expands into the proper alignment to form a desired mold joint plane. As a result, the time-consuming realignment of mold components and subsequent testing needed in the prior art mold disassembly and reassembly steps is not required.

The above process and apparatus enables the sidewall mold inserts to be replaced without disassembly or removal of the entire mold. Heretofore, the traditional securing and attachment methods were through the mold frame itself. As such, the molding unit was taken off-line, allowed to cool, disassembled, reassembled, and then reheated to a molding temperature. The time and production loss which results were substantial.

By relocating the sidewall mold insert apertures and fasteners, the inserts are replaced easily with minimal loss of time and production. The accessibility of the attachment points from the mold interior enables the improved efficiency. The attachment apertures and bolts are covered by the conventional bead ring during the molding process. As a result, the design changes to the mold construction are not apparent from the final molded tire.

The present invention is compatible with sectional molds where the tire tread mold comprises a plurality of distinct sections 21 (FIG. 2) as well as molds using a single tread mold insert in each half of the clam shell mold. Further, sidewall mold inserts according to this invention can be equipped to receive prior art attachment features in addition to the attachment assembly of the present invention.

The above description is given in reference to preferred embodiments of a tire mold assembly with improved designs of the mold components. However, it is understood that many variations are apparent to one of ordinary skill in the art from a reading of the above specification and such variations are within the spirit and scope of the instant invention as defined by the following appended claims.

That which is claimed:

1. In a mold for curing a tire, the mold having an axis, tread mold inserts for molding a tread region of the tire, sidewall mold inserts for molding a sidewall region of the tire, and a mold frame for supporting the tread mold inserts and the sidewall mold inserts, the improvement comprising:

a mold frame having an aperture open on at least the axially inward side of the mold frame;

a sidewall mold insert having means forming a through aperture extending completely through the sidewall mold insert so as to be open on both the axially inward and axially outward sides of the sidewall mold insert, the sidewall mold insert being positionable axially inwardly of the mold frame relative to the axis of a tire molded in the mold assembly such that the mold frame aperture and the through aperture of the sidewall mold insert are aligned with one another with the through aperture axially inward of the mold frame aperture; and, a fastener disposable in the aligned apertures between a seated disposition in which the fastener is seated in both apertures and a non-seated disposition in which the fastener is not seated in the mold frame aperture and the through aperture forming means having means for preventing axially outward movement of the fastener in its seated disposition beyond an extent that the fastener would be completely unseated from the through aperture.

2. The mold according to claim 1 wherein the fastener has a distal end portion and a proximate end portion, the proximate end portion being disposed in the through aperture of the sidewall mold insert and the distal end portion being disposed in the mold frame in the seated disposition of the fastener, and the proximate end portion of the fastener includes an enlarged radial segment having a radial extent greater than any radial extent of the distal end portion of the fastener and the through aperture forming means including an enlarged radial portion extending from the axially inward side of the sidewall mold insert and a lesser radial portion having a smaller radial extent than the enlarged radial portion and extending from the enlarged radial portion to the axially outward side of the sidewall mold insert, the enlarged radial portion and the lesser radial portion forming a shoulder portion operable to engage the enlarged radial segment of the proximate end portion of the fastener so as to prevent axially outward movement of the fastener.

3. The mold according to claim 1 wherein said mold frame defines an inner wall along a line forming an included acute angle $\alpha$ in reference to the axis, the mold frame wall being co-planar with an edge wall of the tread mold, the mold frame wall and the edge wall collectively defining a surface for receiving an outer circumferential rim of the tread mold insert.

4. The mold according to claim 1 wherein the sidewall mold insert defines a circumferential rim having an inclined rim wall having an upper edge and a lower edge, said upper edge having a circumference greater than a circumference of the lower rim edge.

5. The mold according to claim 4 wherein the upper edge of the circumferential rim of the sidewall mold insert engages a complimentary surface formed by an end wall of the tread mold insert and the lower edge of the circumferential rim engages a complimentary surface formed by an end-wall of the mold frame.

6. In a mold for curing a tire, the mold having an axis, tread mold inserts for molding a tread region of the tire, sidewall mold inserts for molding a sidewall region of the tire, and a mold frame for supporting the tread mold inserts and the sidewall mold inserts, the improvement comprising:

a mold frame having an aperture open on the axially inward side of the mold frame and extending at most along a partial portion of the axial extent of the mold frame, as measured along the aperture axis, such that the aperture is not open on the axially outward side of the mold frame;

a sidewall mold insert having means forming a through aperture extending completely through the sidewall mold insert so as to be open on both the axially inward and axially outward sides of the sidewall mold insert;

the sidewall mold insert being positionable axially inwardly of the mold frame relative to the axis of a tire molded in the mold assembly such that the mold frame aperture and the through aperture of the sidewall mold insert are aligned with one another with the through aperture axially inward of the mold frame aperture; and a fastener disposable in the aligned apertures between a seated disposition in which the fastener is seated in both apertures and a non-seated disposition in which the fastener is not seated in the mold frame aperture and the fastener having an axial extent less than the combined axial extents of the aligned mold frame aperture and the through aperture.

7. The mold according to claim 6 wherein the fastener has a distal end portion and a proximate end portion, the proximate end portion being disposed in the through aperture of the sidewall mold insert and the distal end portion being disposed in the mold frame in the seated disposition of the fastener, and the proximate end portion of the fastener includes an enlarged radial segment having a radial extent greater than any radial extent of the distal end portion of the fastener and the through aperture forming means including an enlarged radial portion extending from the axially inward side of the sidewall mold insert and a lesser radial portion having a smaller radial extent than the enlarged radial portion and extending from the enlarged radial portion to the axially outward side of the sidewall mold insert, the enlarged radial portion and the lesser radial portion forming a shoulder portion operable to engage the enlarged radial segment of the proximate end portion of the fastener so as to prevent axially outward movement of the fastener.

8. The mold according to claim 6 wherein said mold frame defines an inner wall along a line forming an included acute angle $\alpha$ in reference to the axis, the mold frame wall being co-planar with an edge wall of the tread mold, the mold frame wall and the edge wall collectively defining a surface for receiving an outer circumferential rim of the tread mold insert.

9. The mold according to claim 6 wherein the sidewall mold insert defines a circumferential rim having an inclined rim wall having an upper edge and a lower edge, said upper edge having a circumference greater than a circumference of the lower rim edge.

10. The mold according to claim 9 wherein the upper edge of the circumferential rim of the sidewall mold insert engages a complimentary surface formed by an end wall of the tread mold insert and the lower edge of the circumferential rim engages a complimentary surface formed by an end-wall of the mold frame.

11. The mold according to claim 1 wherein the fastener has a distal end portion and a proximate end portion, the proximate end portion being disposed in the through aperture of the sidewall mold insert and the distal end portion being disposed in the mold frame in the seated disposition of the fastener, and the mold frame having a fastener engaging means operable to engage the distal end of the fastener in the seated disposition of the fastener, the fastener engaging means and the fastener being releasably engageable with one another such that an engagement movement of the fastener moves the distal end of the fastener into releasable engagement with the fastener engaging means so as to prevent axial outward movement of the fastener out of engagement with the fastener engaging means and a disengagement movement axially outward of the fastener distal end out of engagement with the mold frame of the fastener.

12. In a mold for curing a tire, the mold having tread mold inserts for molding a tread region of the tire, sidewall mold inserts for molding a sidewall region of the tire, and a mold frame for supporting the tread mold inserts and the sidewall mold inserts, the improvement comprising:

a mold frame having an aperture open on at least the axially inward side of the mold frame;

a sidewall mold insert having means forming a through aperture extending completely through the sidewall mold insert so as to be open on both the axially inward and axially outward sides of the sidewall mold insert, the sidewall mold insert being positionable axially inwardly of the mold frame relative to the axis of a tire molded in the mold assembly such that the mold frame aperture and the through aperture are aligned with one another and the through aperture is axially inward of the mold frame aperture;

a fastener disposable in the aligned apertures between a seated disposition in which the fastener is seated in both apertures and a non-seated disposition in which the fastener is not seated in the mold frame aperture; and means for preventing axially outward movement of the fastener in its seated disposition beyond an extent that the fastener would be completely unseated from the through aperture.

13. The mold according to claim 12 wherein the means for preventing axially outward movement of the fastener is a bead ring mold insert.

14. A process of changing the sidewall mold insert of a tire mold comprising the steps of:

supplying a mold for curing a tire, the mold having an axis, tread mold inserts for molding a tread region of the tire, sidewall mold inserts for molding a sidewall region of the tire, and a mold frame for supporting the tread mold inserts and the sidewall mold inserts;

opening said tire mold to provide access to an interior molding surface of said mold;

engaging from a mold interior the engaging means of a fastener securing the sidewall mold insert to the mold frame, said engaging means of said fastener in communication with the interior of the open mold;

unseating the fastener securing the sidewall mold insert to the mold frame;

removing the sidewall mold insert from the mold;

positioning a new sidewall mold insert within the mold;

engaging from a mold interior the engaging means of a fastener carried by the new sidewall mold insert; and, seating the fastener within the mold frame, thereby securing the sidewall mold insert to the mold frame.

15. The process according to claim 14 wherein said step of supplying a mold further comprises supplying a mold wherein said tread mold insert, said sidewall mold inserts, and an interior of said mold frame are maintained at an approximate curing temperature.

16. The process according to claim 15 wherein said new sidewall mold insert is an ambient temperature substantially less than that of the removed sidewall mold insert.

* * * * *